United States Patent [19]

Hardin

[11] Patent Number: 4,510,996
[45] Date of Patent: Apr. 16, 1985

[54] WELL SCREEN ASSEMBLY WITH LONGITUDINALLY PORTED CONNECTOR SUB

[75] Inventor: James R. Hardin, Lafayette, La.
[73] Assignee: UOP Inc., Des Plaines, Ill.
[21] Appl. No.: 538,727
[22] Filed: Oct. 3, 1983
[51] Int. Cl.³ ............................................. F21B 43/08
[52] U.S. Cl. ..................................... 166/227; 166/51; 166/236
[58] Field of Search .................. 166/227, 278, 56, 51, 166/228–236, 157, 205

[56] References Cited

U.S. PATENT DOCUMENTS

| | | | |
|---|---|---|---|
| 1,473,644 | 11/1923 | Rodrigo, Sr. | 166/236 |
| 4,018,283 | 4/1977 | Watkins | 166/278 |
| 4,105,069 | 8/1978 | Baker | 166/51 |
| 4,372,384 | 2/1983 | Kinney | 166/51 X |
| 4,424,864 | 1/1984 | Logan | 166/278 |

Primary Examiner—Stephen J. Novosad
Assistant Examiner—Thuy M. Bui
Attorney, Agent, or Firm—James R. Hoatson, Jr.; Barry L. Clark; William H. Page, II

[57] ABSTRACT

Well screen assembly for permitting a plurality of pipe based well screen segments in an extended length production zone to be brought into operation, simultaneously uses a ported connector sub to join each pair of screen segments so that the ends of the relatively large diameter perforated pipe base supports are attached to the connector's ends. Each screen also has solid internal pipe members of much smaller diameter which are joined to a central bore in the connector. Annular spaces between the internal pipe members and the pipe base supports communicate through the connector ports and permit flow from both screens to reach the inside of the inner pipe members when downhole perforations are made in only one of the inner pipe members.

4 Claims, 1 Drawing Figure

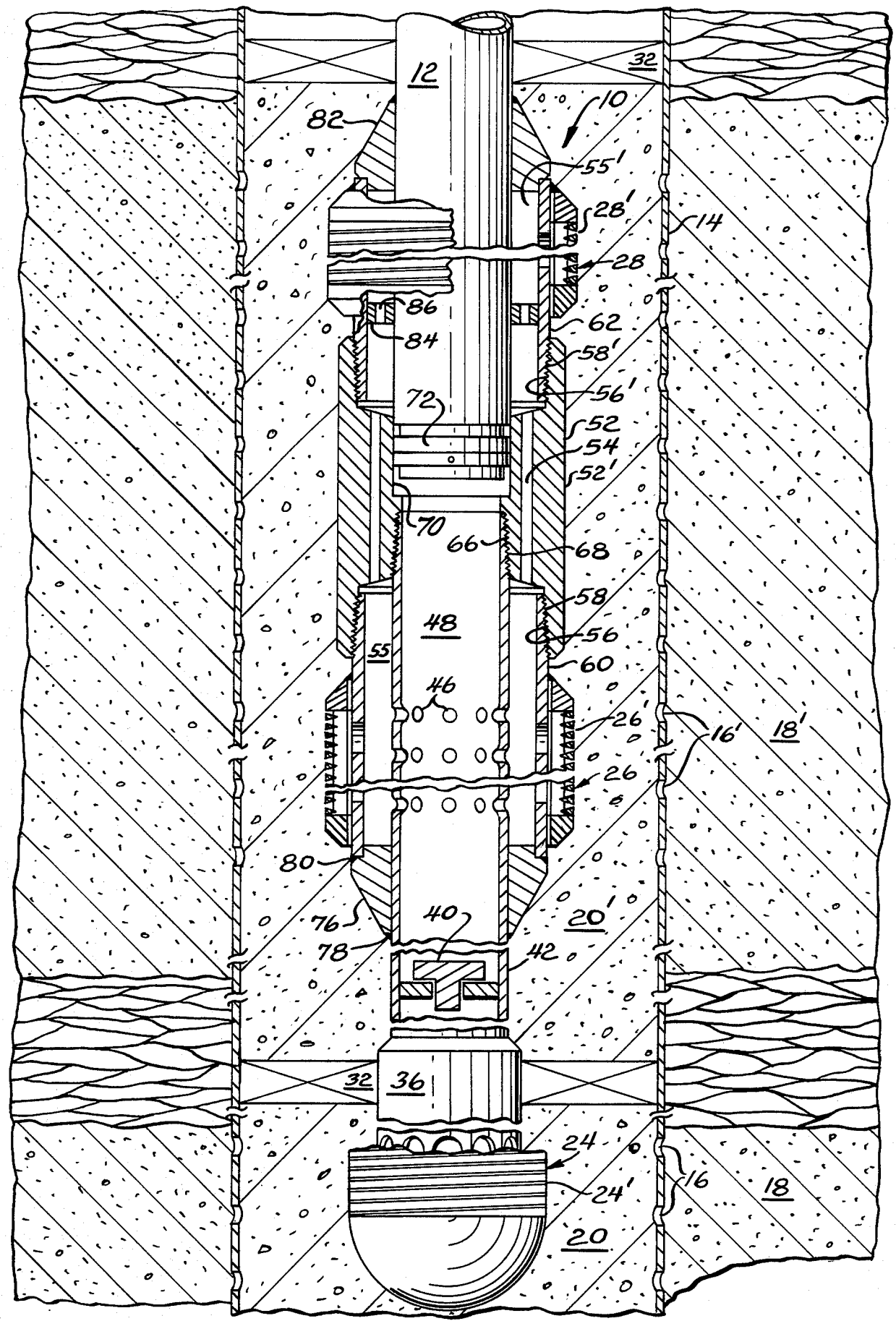

WELL SCREEN ASSEMBLY WITH LONGITUDINALLY PORTED CONNECTOR SUB

BACKGROUND OF THE INVENTION

The invention relates to the production of fluids through well screens from multiple producing zones in a well, and more particularly, to the production of fluid from a well zone from which no production is desired until production from a lower zone has been completed or until the screen in the lower zone has been severely eroded by sand. An example of a system for accomplishing such selected production is the selecta-flow screen system sold by Baker Sand Control Company of Houston, Tex. The aforementioned system uses a regular screen in the lower zone which, upon initial completion of the well, is sealed with respect to one or more selectively operable screen segments in an upper zone by a packer and by a length of nonperforated inner pipe. The upper zone screens are normally isolated from communication with either the surface or with the lower screen by a solid or unperforated center pipe located on the screen axis. When the lowermost one of the upper screens is to be activated, a wire line plug is set in a nipple below the screen to be activated and the inner pipe opposite to the screen being activated is perforated. When each of the additional upper screens is to be activated, a plug is set in a nipple joining it to the screen below it to close off flow from below and a perforating tool is deployed and actuated to perforate the inner pipe opposite the screen being activated.

SUMMARY OF THE INVENTION

It is among the objects of the present invention to provide a well screen assembly which permits a plurality of normally inoperative secondary well screens in a well to be brought into production simultaneously. It is an additional object of the invention to provide such an assembly which is simply and quickly actuated and which avoids the time, expense and possible dangers of downhole perforating of the normally unperforated center pipe at spaced intervals of time and/or at locations other than opposite a single secondary screen.

The foregoing and other objects and advantages are achieved by the screen assembly of the present invention which includes a novel and unique connector sub between each pair of axially adjacent secondary well screens from which simultaneous production is desired. The connector sub is generally tubular and has a wall portion intermediate its ends of substantial thickness. A relatively large diameter female thread is formed at each end of the connector sub for connecting a male end portion of the pipe base support for each secondary screen to the connector sub. The ends of the connector sub are recessed to accommodate said male end portions of the screen pipe bases with the inner ends of the recesses being defined by shoulder portions whose inner radial extent is defined by a relatively small diameter bore extending the entire axial length of the aforesaid wall portion. The relatively small diameter bore accommodates the center pipe portions which extend from each of the secondary screens and which are concentric with the pipe bases. Preferably, the bottom bore has a female thread which mates with the threaded male end of the center pipe of the lower secondary screen. The upper bore is preferably smooth so as to slidingly engage a complementary unthreaded male end of the center pipe of the upper secondary screen. One or more bore portions are formed so as to extend completely through the aforesaid wall portion in a longitudinal direction so as to form ports which permit liquid located in the annular region between the center pipe and pipe base of either secondary screen to flow therethrough. Since liquid can flow through the last mentioned longitudinally extending ports, it is possible to perfrom a perforating operation in the normally solid inner pipe opposite only a single screen segment of the pair joined by the connector sub and yet collect flow from both screen segments.

BRIEF DESCRIPTION OF THE DRAWING

The drawing is a sectional view taken on the axis of the well screen assembly and an associated length of well casing.

DETAILED DESCRIPTION OF THE DRAWING

The drawing illustrates a well screen assembly indicated generally at 10 which is suspended from a length of unperforated inner pipe 12. The screen assembly 10 is adapted to be mounted in a tubular casing 14 which is perforated as indicated at 16. 16' in those regions of its length wherein it passes through porous formations 18, 18' which define production zones from which the production of fluids is desired. Fluids to be produced from the various production zones 18, 18' may pass through gravel pack areas 20, 20' and be collected through well screens such as screens 24, 26 and 28 when conditions are correct for such collection. The gravel pack areas, such as area 20', are sealed at each end by a packer element 32 which may be of any conventional construction and is indicated in a schematic fashion.

In the configuration which is depicted, the screen 24 is shown to be of conventional welded wire construction and supported on a perforated pipe base member 36. After the assembly 10 has been lowered into the casing 14 and the gravel packs 20, 20' and the packers 32 have been installed, production would normally proceed initially from zone 18 with the flow being collected solely by screen 24. When production from zone 18 was completed, or when the slots 24' in screen 24 were widened by erosion such that the well began to pump sand, the upward flow of fluid through pipe 36 would be cut off. The cut-off would be made by inserting a plug, such as the plug indicated schematically at 40, by a wire line (not shown) into a nipple assembly 42. It should be noted, that during production through lower screen 24, the perforations 46, which are illustrated in the drawing as being present in the inner pipe member portion 48 of the screen 26, would not be present. Thus, the path of the inner tubing members 48, 12 from nipple 42 to the top of the well would be continuous and isolated from fluid in the formation 18'.

Once the plug 40 is set and production from zone 18' is desired, a mechanical perforator (not shown) is lowered on a wire line and actuated to drive a pointed perforating pin through the previously solid wall of the inner tube 48 so as to form perforations 46 at various locations along the wall. Typically, the perforations would only be formed in a single vertical line since it is only necessary that they provide sufficient open area to handle all of the expected flow through both screen 26 and screen 28. A number of additional perforations 46 have been shown in a circumferential pattern for purposes of clarity in order to better illustrate the contrast with upper inner pipe member 12 which has no perforations.

A principal feature of the invention is the connector sub element 52 which joins upper screen assembly 28 to the relatively lower screen element 26. The relatively thick wall 52' of the connector includes a plurality of through bores or ports 54 around its circumference which connect the upper open annular space 55' between the screen slots 28' and the outer wall of the inner pipe 12 to the lower annular space 55 between the screen slots 26' and the inner pipe 48. Because of the ports 54 connecting the screens 26, 28 it is possible to join two screens in a single gravel packed area of a well casing and to avoid the tremendous expense, delay, and possible danger associated with performing a second perforating operation when it was desired to bring the upper screen into production in a conventional arrangement. It is not desirable to attempt to form screens of lengths greater than 40 feet, and yet producing zones are often longer than 40 feet. Thus, the use of a single connector sub 52 allows the use of 80 feet of screen in a single production zone. Additional connector subs could also be used to extend the overall screen length to 120 feet or more.

The connector sub 52 has threaded openings 56, 56' at its lower and upper ends, respectively, which are adapted to be threadedly engaged with the threaded end portions 58, 58' of the pipe base supports 60, 62 of screens 26, 28. Central bores are formed at each end of the connector with lower bore 66 being provided with an internal thread to mate with thread 68 on pipe 48. The bore 70 at the upper end of the connector is smooth and adapted to be sealingly engaged with a seal 72 on the lower end of pipe 12. Typically, the connector 52 would be assembled at the surface to the lower screen 26 by threading together threads 56 and 58. The inner pipe 48 would then be inserted into the screen and have its threads 68 threaded into bore threads 66. The collar 76 would then be assembled over the pipe 48 and welded to the pipes 48 and 60 as indicated at 78, 80. The screen 26 and connector 52 would then be lowered into the casing 14 and threaded to the nipple 42. The upper screen assembly 28 would then be lowered so that the lower end of inner pipe 12 will slide into bore 70 while the threads 58' are threaded to threads 56'. The upper screen assembly 28 would be welded together on the surface so that collar 82 is attached to pipes 12 and 62. Centralizer 84 having ports 86 is also attached to pipes 12 and 62.

I claim as my invention:

1. A well screen assembly comprising a plurality of vertically spaced screen sections having internal support pipes and being adapted to be positioned in a well between a pair of spaced gravel packs, said assembly including at least a pair of upper and lower screen sections which are joined by an axially elongated, generally cylindrical connector sub having end openings and relatively large diameter threaded end wall portions at each of its ends to which said screen sections are joined, said connector having an intermediate wall portion located between said end openings which is substantially thicker than the end wall portions surrounding said end openings, the inner surface of said intermediate wall portion including a lower threaded portion adapted to be threaded to at least one pipe which is adapted to be concentrically positioned within and radially inwardly spaced from the lower one of said screen sections, said intermediate wall portion having longitudinal ports formed therein in a direction parallel to the connector axis, said ports being located so as to permit fluid to flow through the connector from a radial annular space which is inboard of said lower screen section attched to the lower end of the connector and outboard of said at least one pipe to a similar annular space which is inboard of a second screen section attached to the upper end of the connector.

2. The well screen assembly of claim 1 wherein said connector has an additional inner surface adjacent its upper end which has a smooth bore and is adapted to sealingly engage the lower end of a pipe positioned inwardly of the upper screen section.

3. The well screen assembly of claim 2 wherein the lower end of said last named pipe carries sealing rings which are adapted to engage the said smooth bore.

4. The well screen assembly of claim 2 wherein the inner support pipes within each of said screen sections are unperforated so that no communication is possible between the radial annular space in either screen section and the inside bore of the connector or either of the inner pipes connected to it until such time as perforations are formed in one of the inner pipes.

* * * * *